May 18, 1954     I. M. EISENBERG     2,678,852
FLUID PRESSURE BRAKE EQUIPMENT
Filed Jan. 28, 1950     2 Sheets-Sheet 2
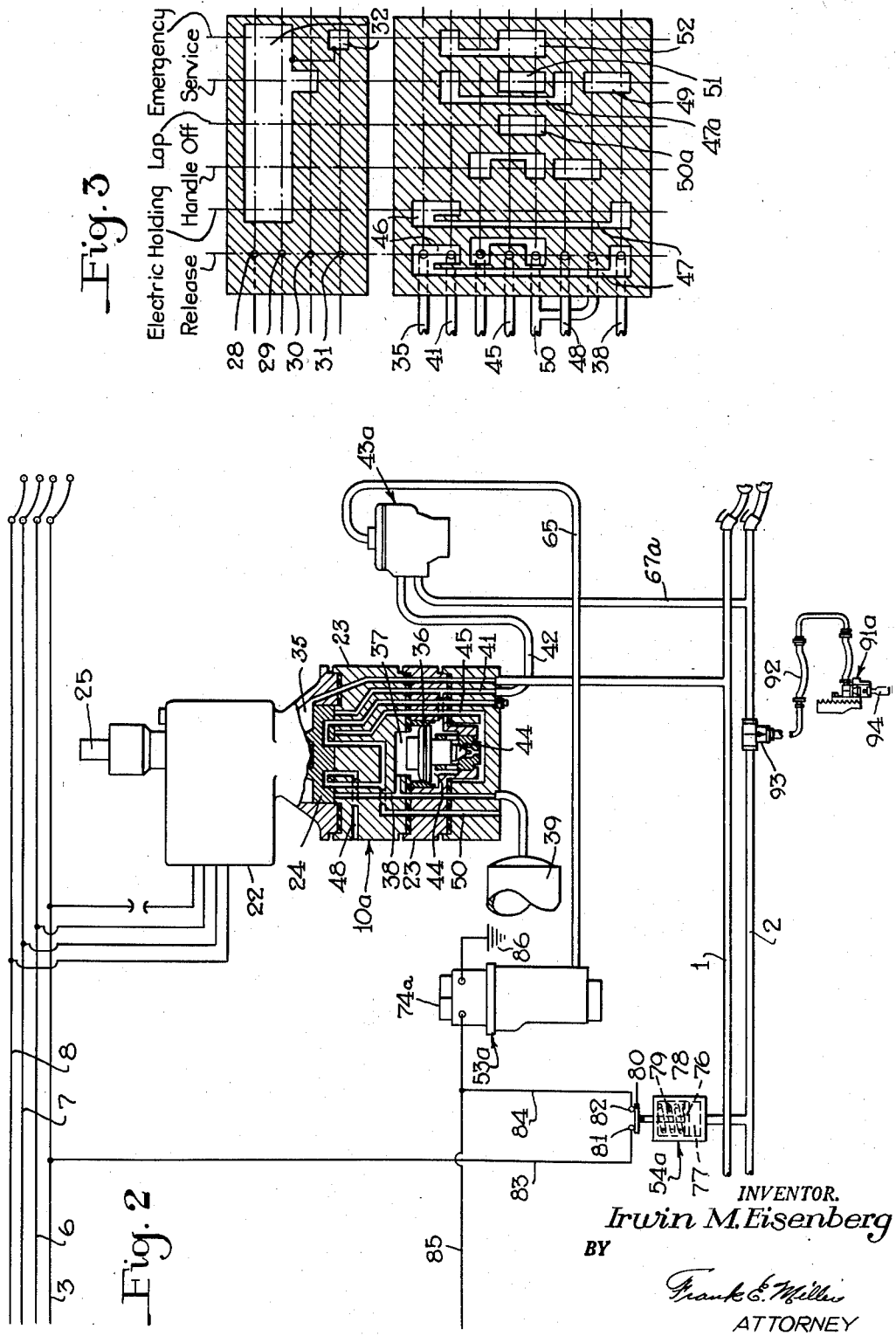
INVENTOR.
Irwin M. Eisenberg
BY
Frank E. Miller
ATTORNEY Patented May 18, 1954

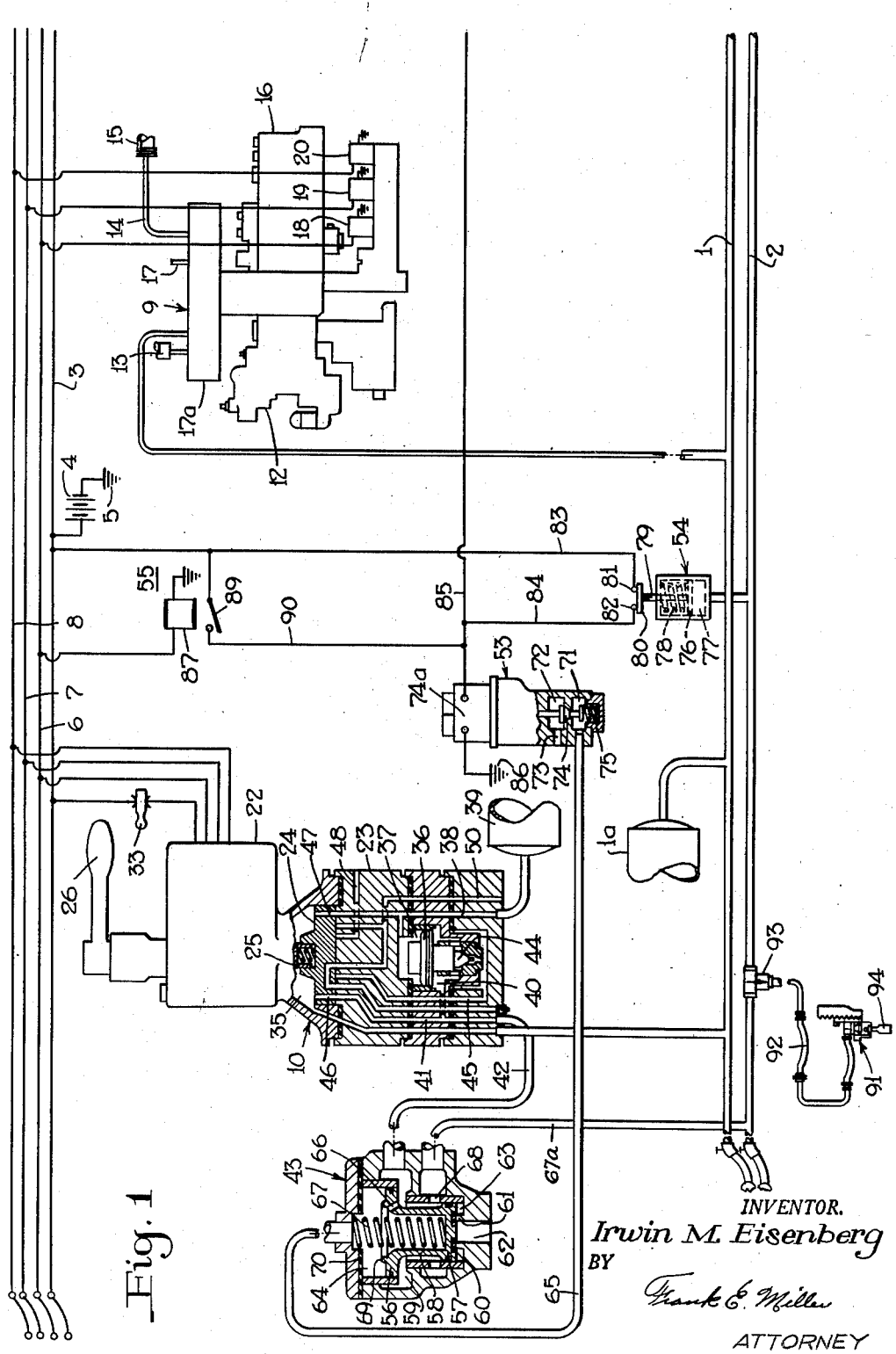

2,678,852

UNITED STATES PATENT OFFICE 2,678,852

FLUID PRESSURE BRAKE EQUIPMENT

Irwin M. Eisenberg, Irwin, Pa., assignor to Westinghouse Air Brake Company, a corporation of Pennsylvania Application January 28, 1950, Serial No. 141,042

8 Claims. (Cl. 303—18)

This invention relates to fluid pressure brake equipment and more particularly to the electro-pneumatic type for use in connection with braking vehicles adapted to be controlled from either end and to be operated individually or in trains, such as subway cars or the like.

Certain vehicles in the above type of service have for years been equipped with Westinghouse Air Brake Company's "AMUE" Electro-Pneumatic Brake Equipment fully disclosed in their Instruction Pamphlet No. T-5051-13 dated February 1938. This equipment comprises two trip valve devices located at opposite sides of the vehicle, one on each truck, in such a manner that when a road bed trip is set against train movement, said trip will engage a normally depending handle of one of the trip valve devices and operate said device to an open position for effecting an emergency reduction in pressure in the usual brake pipe to thereby cause an emergency application of brakes on the vehicle or train, as the case may be, to promptly bring it to a stop. A trip valve device application of brakes usually occurs, as just described, when the operator's brake valve device is in release position supplying fluid under pressure to the brake pipe. It is undesirable to thus continue supply of fluid under pressure to the brake pipe which is open to atmosphere through the operated trip valve device, so it is customary to promptly move the brake valve device to lap position to cut off the supply of fluid under pressure to the brake pipe when such an application of brakes occurs. Before the car or train is again operated, the operator must leave his control station and go down along the road bed to the trip valve device which had operated to cause the emergency application of brakes and move the handle thereof back to its normally depending position to close the vent from the brake pipe, following which, he will return to his control station in the vehicle or train and move his brake valve device to release position to recharge the brake pipe and brake system for releasing the brakes on the vehicle or train after which he may proceed.

Recently new cars placed in the above type of service have been equipped with what is known as the "SMEE" brake equipment which is substantially like that disclosed in the pending application of Samuel L. Williams et al., Serial No. 47,046, filed August 31, 1948, now Patent No. 2,591,224 issued April 1, 1952. This brake equipment, in contrast to the "AMUE" brake equipment, embodies an automatically closing or resetting trip valve device, that is, a trip valve device which after operation by a road bed trip to vent the brake pipe for effecting an emergency application of brakes, automatically closes the vent from the brake pipe to eliminate the need for the operator to leave his control station for resetting the trip valve device, as required with the "AMUE" brake equipment, to release the application of brakes. Further, with the "SMEE" brake equipment the operator's brake valve device when in release position does not establish a brake pipe charging communication like the brake valve device in the "AMUE" brake equipment so that it is not necessary, when a trip valve emergency application of brakes is effected, to move the brake valve device out of release position to avoid undesired waste of fluid under pressure. In order to release a trip valve emergency application of brakes with the "SMEE" brake equipment it is however necessary to move the brake valve device to a full service position for recharging the brake pipe and certain other parts of the equipment to a certain pressure while retaining the brakes fully applied, after which the brake valve device will be returned to release position to release the brakes.

It is now desired to use the automatic closing type of trip valve device employed with the "SMEE" brake equipment on vehicles equipped with the old "AMUE" brake equipment in place of the manually resettable type which have been used to date but the mere substitution of one for the other will not be satisfactory since, on account of the brake valve device of the "AMUE" brake equipment establishing a brake pipe charging communication in its release position, an emergency application of brakes initiated by operation of the automatic closing type of trip valve device could be promptly released unless the operator promptly moves the brake valve device out of its release position which can not be depended upon since the operator might be incapacitated.

The principal object of the invention is therefore to so modify the "AMUE" brake equipment as to permit use of an automatic closing type of trip valve device therewith.

Other objects and advantages will become apparent from the following more detailed description of the invention.

In the accompanying drawings: Figs. 1 and 2, when the right-hand edge of Fig. 1 is matched to the left-hand edge of Fig. 2, is a diagrammatic view, partly in section and partly in outline, of an electro-pneumatic brake equipment embodying the invention; and Fig. 3 is a diagrammatic, development view of switch and valve portions of operator's brake valve devices shown in Figs. 1 and 2.

Description

As shown in the drawing, 1 is a fluid pressure supply pipe adapted to be constantly supplied with fluid under pressure from any suitable source, such as a reservoir 1a; 2 is a brake pipe; 3 is an electric supply wire connected to one terminal of an electric supply such as a battery 4, the other terminal of which is grounded at 5; 6 is a brake release wire; 7 is a service application wire; and 8 is an emergency application wire, all of said pipes and wires extending to opposite ends of a vehicle for connection with corresponding parts on another vehicle in the case of a train. 9 is a brake controlling valve device and 10 and 10a are two identical operator's brake valve devices adapted to be located at opposite ends of the vehicle. The parts so far enumerated are identical in structure and operation and are connected in the same manner as corresponding parts in the "AMUE" brake equipment disclosed in the above referred to instruction pamphlet and since reference may be made to said pamphlet for a detailed description of this equipment, only a brief description of these parts as necessary for an understanding of the invention will now be given herein.

The brake controlling valve device 9 comprises a service application valve device 12 adapted to respond to a service reduction in pressure in the brake pipe 2 to supply fluid from a precharged auxiliary reservoir 13, at a pressure corresponding to the degree of such reduction, to a pipe 14 which, for illustration, may be connected directly to a brake cylinder device 15 whereby such pressure may operate said brake cylinder device to effect an application of brakes. The brake controlling valve device 9 further comprises an emergency application valve device 16 arranged to operate upon an emergency reduction pressure in brake pipe 2 to supply fluid from a source, such as a pipe 17, to the brake cylinder device 15 for effecting an emergency application of brakes. Upon restoration of pressure in brake pipe 2 the service application valve device 12 and emergency application valve device 16 are adapted to operate to their normal position for releasing fluid under pressure from the brake cylinder device 15 and for recharging auxiliary reservoir 13 with fluid under pressure from the brake pipe.

The service application valve device 12 and emergency application valve device 16 are mounted on opposite sides of a pipe bracket 17a with which there is associated a magnet valve portion comprising a release magnet 18, a service application magnet 19 and an emergency application magnet 20, said magnet valve devices being connected to the release, service and emergency wires 6, 7 and 8 respectively. Upon supply of electric current from battery 4 to the release wire 6 and service wire 7 the release magnet 18 and service magnet 19 are adapted to be energized to, respectively, close a vent from the brake cylinder device 15 and to supply fluid under pressure to said brake cylinder device for effecting a service application of brakes on the vehicle. Upon energization of the release wire 6 and emergency wire 8 by current from battery 4 the release magnet 18 and emergency magnet 20 are adapted to be energized for, respectively, closing a vent from the brake cylinder device the same as in effecting a service application of brakes, and for also supplying fluid under pressure to the brake cylinder device 15 for effecting an emergency application of brakes. Supply of electric current from battery 4 only to the release wire 6 subsequent to effecting a service application of brakes will maintain the vent from the brake cylinder device 15 closed to thereby hold an application of brakes in effect.

The brake valve devices 10 and 10a each comprises an electric switch portion 22 and a valve portion 23 including a rotary valve 24, said switch portion and rotary valve being arranged for operation in unison by a common shaft 25 adapted to be turned by an operator's removable handle 26. Only one handle 26 is provided on a vehicle and is applied to the brake valve device at the selected control end of the vehicle, as shown in the drawing.

The brake valve handle 26, and thereby the electric portion 22 and rotary valve 24 in each brake valve device has spaced apart, Release, Electric Holding, Handle Off, Lap, Service and Emergency positions, as designated in Fig. 3 by legends. The brake valve handle 26 is shown in Fig. 1 in its Release position and in Fig. 2 in its Handle Off position.

The electric portion 22 of each brake valve device 10 and 10a comprises four spaced apart fixed contacts 28, 29, 30 and 31 and a movable contact 32 (Fig. 3) arranged to cooperate with said fixed contacts according to different positions of the brake valve handle 26, as will be presently described. The fixed contact 28 is adapted to be connected to the current supply wire 3 by a removable plug switch 33 only one of which is provided on the vehicle and adapted to be used at the end of the vehicle from which it is desired to control the vehicle brakes. At the opposite or non-control end of the vehicle the fixed contact 28 in the brake valve device will not therefore be connected to the current supply wire 3. The contacts 29, 30 and 31 at both brake valve devices 10 and 10a are connected respectively to the release wire 6, the service application wire 7 and the emergency application wire 8.

In each brake valve device 10, 10a the rotary valve 24 is contained in a chamber 35 which is constantly supplied with fluid under pressure from the fluid pressure supply pipe 1. Each brake valve device further comprises an equalizing discharge valve device embodying a piston 36 subject on one side to pressure of fluid in a chamber 37 which is connected to a passage 38 leading in one direction to the seat of rotary valve 24 and in the opposite direction to an equalizing reservoir 39. At the opposite side of piston 36 is a chamber 40 connected to a passage 41 leading to the seat of rotary valve 24 and also connected to a pipe 42 adapted to be normally open to brake pipe 2 through a brake application valve device 43 at the brake valve device 10 or 43a at the brake valve device 10a. The valve devices 43, 43a constitute a part of the invention and will be described subsequently. Carried by piston 36 is a brake pipe discharge valve 44 arranged to control communication between chamber 40, and thereby the brake pipe 2, and an exhaust passage 45 leading to the seat of the rotary valve 24.

Assuming that the brake valve device 10a is at the non-control end of the vehicle and in Handle Off position and that the plug switch 33 is applied only at the opposite or control end, it will be noted that the current supply via wire 3 to said brake valve device is cut off and the release contact 29, service contact 30 and emergency contact 31 are disconnected from each other, while at the rotary valve 24, passage 41 from the brake pipe 2, passage 45 from the brake pipe discharge valve 44 and passage 38 from the equalizing reservoir 39 are all lapped by said rotary valve, so as to provide for control of brakes only by the brake valve device 10 at the opposite or selected control end of the vehicle.

With the brake valve device 10 at the selected control end of the vehicle in Release position, in which it is shown in Fig. 1, a port 46 through the rotary valve opens chamber 35 to the brake pipe passage 41, and assuming that said chamber is charged with fluid under pressure from the supply pipe 1, such fluid will flow through said port to said passage and thence through the brake application valve device 43 to the brake pipe 2 to charge same and to thereby actuate the service application valve device 12 and emergency application valve device 16 of the brake controlling valve device 9 to their normal or brake release positions. Chamber 40 below the equalizing piston 36 being connected to the brake pipe passage 40 will also become charged with fluid at the same pressure as the brake pipe 2.

Fluid under pressure from the rotary valve chamber 35 in brake valve device 10 will also flow through a port 47 in rotary valve 24 to passage 38, and thence to the equalizing reservoir 39 and equalizing piston chamber 37 to charge said reservoir and chamber with fluid at the same pressure as in the brake pipe. With the equalizing piston 36 thus subject on opposite sides to the same pressures of fluid, said piston will hold the discharge valve 44 seated.

Also in Release position of the brake valve device 10 no electrical circuits are established in the electric portion 22 whereby the release magnet 18 will be deenergized for venting the brake cylinder device 15.

Now let it be assumed that the handle 26 of the brake valve device 10 is turned to Service position. The release magnet 18 will thereby be energized to close the brake cylinder release vent and the service application magnet 19 will also be energized to effect an electro-pneumatic service application of brakes. The rotary valve 24 will also be in service position in which the brake pipe passage 41 and equalizing piston chamber 40 are disconnected from the fluid pressure supply in rotary valve chamber 35 and connected by way of a cavity 47a to an exhaust passage 48, and at the same time a cavity 49 in the rotary valve will connect equalizing reservoir passage 38 to an exhaust passage 50 to which the discharge valve passage 45 will also be open via a cavity 51 in the rotary valve. The consequent venting of fluid under pressure from the equalizing reservoir 39 and piston chamber 37 will reduce such pressure below the brake pipe pressure in chamber 40, as a result of which, the equalizing piston 36 will move up to unseat the discharge valve 44 whereupon fluid under pressure will also be vented from the brake pipe 2 past said valve to passage 45 and thence through cavity 51 in the rotary valve and exhaust passage 50 to atmosphere. It will be noted that fluid under pressure is vented from the brake pipe 2 via cavity 47a in the rotary valve as well as past the discharge valve 44, the vent via cavity 47a initiating the reduction in brake pipe pressure sooner than would be the case past said discharge valve, but due to the relatively large volume of the brake pipe 2 on a vehicle as compared to that of the equalizing reservoir 39, the reduction in pressure in said reservoir and equalizing piston chamber 37 will overtake and then lead the reduction in brake pipe pressure upon opening of the discharge valve 44 to permit the reduction in pressure in said reservoir to control the degree of reduction in pressure in the brake pipe 2, as will be later brought out.

If the service magnet 19 becomes energized and effects an application of brakes as intended upon movement of the brake valve handle 26 to service position, the reduction in pressure in brake pipe 2 effected as just described will be to no avail, but in case such application of brakes fails to materialize, then the service portion 12 of the brake controlling valve device 12 will operate in response to the reduction in pressure in brake pipe 2 to effect an application of brakes.

When a desired degree of service brake application is obtained, the brake valve handle 26 will be moved to Lap position to effect deenergization of the service application magnet 19 while holding the release magnet 18 energized. The supply of fluid to the brake cylinder device 15 will thereby be cut off while the release magnet remaining energized will hold the pressure in said brake cylinder device to maintain the brakes applied.

Also in Lap position of handle 26 the brake pipe 2 will be disconnected from the exhaust passage 48, the equalizing reservoir 39 will be disconnected from the exhaust passage 50 but the brake pipe discharge valve passage 45 will remain open to the exhaust passage 50 via cavity 50a. The reduction in pressure in the equalizing reservoir 39 and piston chamber 37 will thereby be terminated, but brake pipe pressure acting on the opposite side of the equalizing piston 36 will hold the discharge valve 44 open and permit fluid under pressure to continue to release from the brake pipe 2 until the pressure therein becomes reduced to substantially that still effective in equalizing piston chamber 37 whereupon the piston 36 will be operated to seat the discharge valve 44. If the application of brakes is due to the reduction in pressure thus affected in the brake pipe, the degree of such application will be correspondingly limited by operation of the service application valve device 12 in the well-known manner.

If it is desired to effect an increased application of brakes, the brake valve handle 26 may be moved from Lap position again to Service position to increase the application to the desired degree, and then be moved back to Lap position, as will be clear from the above description.

If due to energization of the release magnet 18 and service magnet 19 the brakes on the vehicle are applied and it is desired to restore the pressure in brake pipe 2 back to normal while holding the brakes thus applied, the brake valve handle 26 will be moved to Holding position in which the release magnet 18 will remain energized to hold the brakes applied, and in which via ports 46 and 47 in the rotary valve 24 the brake pipe 2 and equalizing reservoir 39 and thereby chambers 37 and 40 at opposite sides of the equalizing piston 36 will be recharged with fluid to the pressure normally carried in the brake pipe. It will be apparent that if the application of brakes were due to the previous reduction in pressure in brake pipe 2, the recharging the brake pipe in Holding position would release such application; that is, the Holding position is only for the purpose above described and is of no account when the application is due to a reduction in pressure in brake pipe 2.

In order to release an application of brakes, the brake valve handle 26 will be returned to Release position for deenergizing the release magnet 18 and for recharging the brake pipe 2 in the same manner as in Holding position, if not already so charged, whereupon the release of brakes will occur due either to operation of said magnet or the increase in pressure in the brake pipe, as the case may be.

If it is desired to effect an emergency application of brakes the brake valve handle 26 will be moved to Emergency position for energizing the release magnet 18 and emergency magnet 20 and for at the same time opening the brake pipe passage 41 to the exhaust passage 50 via cavity 52 in the rotary valve whereby in either case an emergency reduction in brake pipe pressure will occur to cause operation of the emergency portion 16 of the brake controlling valve device 9 to effect an emergency application of brakes on the vehicle.

In order to release the brakes after an emergency application the brake valve handle 26 may be returned to Release position, or first to Holding position, if desired, whereupon the release will occur in the same manner as above described.

According to the invention, I provide adjacent the brake valve devices 10, 10a, in addition to the brake application valve devices 43 and 43a, magnet valve devices 53, 53a, and pneumatic switches 54, 54a, respectively.

Each brake application valve device 43, 43a comprises a casing and two coaxially arranged and spaced apart pistons 56, 57 of different areas slidably mounted in said casing and connected together by a hollow stem 58. Between the two pistons 56 and 57 is a chamber 59 open to pipe 42 from the brake valve device. In the opposite face of piston 57 is a valve 60 arranged to cooperate with an annular seat rib 61 for closing communication between an exhaust passage 62 encircled by said rib and open to atmosphere, and an annular cavity 63 encircling said rib. At the opposite side of piston 56 is a chamber 64 open to a control pipe 65 and also open through a relatively small port 66 in said piston to chamber 59, the chamber 64 containing a spring 67 acting on the two pistons for urging them to their normal positions in which valve 60 carried by piston 57 is in sealing contact with rib 61. With the piston 57 in this normal position a pipe 67 open to brake pipe 2 is also open through one or more casing ports 68 to chamber 59. The pistons 56, 57 are slidable from their normal position to another position defined by contact of a rib 69 on the outer face of piston 56 with a gasket 70, and in which other position the piston 57 is adapted to be disposed at the opposite side of ports 68 for disconnecting said ports from chamber 59 and opening same to cavity 63 and thereby atmosphere through passage 62.

The control pipe 65 at each end of the vehicle leads to a chamber 71 in the respective magnet valve device 53 or 53a which also has another chamber 72 open to atmosphere through a passage 73 and containing a valve 74 for controlling communication between said chambers. Each magnet valve device 53, 53a further comprises a magnet 74a operative upon energization to close the valve 74. Upon deenergization of magnet 74a a spring 75 acting on valve 74 will open said valve.

Each switch device 54, 54a comprises a casing containing a piston 76 at one side of which is a chamber 77 open to brake pipe 2 whereby said piston is constantly subject on its one face to pressure of fluid in said brake pipe, while the opposite face of said piston is subject to opposing pressure of a spring 78. A rod 79 secured at one end to piston 76 is provided at its opposite end with a contact 80 for electrically connecting two fixed contacts 81 and 82 connected, respectively, by a wire 83 to the current supply wire 3 and by a wire 84 to a wire 85 connected to one terminal of both magnets 74a the opposite terminals of which are grounded at 86.

According to the invention I also add to the brake equipment an electric switch device 55 comprising a magnet 87 connected between the release wire 6 and a ground 88, and a contact 89 adapted upon energization of said magnet to connect wire 83 to a wire 90 connected to wire 85. Upon deenergization of magnet 87 the contact 89 is adapted to drop out for breaking the electrical connection with wires 83 and 90.

According to the invention I further provide at opposite ends of the brake equipment automatic closing trip valve devices 91, 91a, respectively, each of which is connected to the brake pipe 2 through a conduit 92 and a T connection 93 containing a check valve (not shown) arranged to permit flow of fluid in the direction from the brake pipe to said trip valve device but to prevent flow in the opposite direction. The trip valve devices 91, 91a and T connections 93 are identical to those employed in the "SMEE" brake equipment heretofore referred to, each trip valve device comprising a normally depending arm 94 adapted upon engagement with a road bed trip (not shown) to be swung out of the depending position to open the brake pipe 2 to atmosphere and which is adapted to automatically return to its depending position and close the connection between brake pipe and atmosphere when pressure in the brake pipe is reduced to a chosen low degree.

In operation, in order to initially charge the brake equipment embodying the invention the brake valve handle 26 at the control end of the vehicle must be moved to Electric Holding position for energizing the release wire 6 and thereby the magnet 87 and for also supplying fluid under pressure to pipe 42. With magnet 87 energized its contact 89 will be closed to connect the current supply wire 3 to wire 90 and thence wire 85 connected to both magnets 74a whereby the latter magnets will be energized to close the respective valves 74.

At the control end of the vehicle fluid under pressure supplied to pipe 42 by the controlling brake valve device 10 as just mentioned will flow to chamber 59 in the brake application valve device 43 and thence through port 66 to chamber 64 at the opposite side of piston 56 and from the latter chamber will equalize into the connected pipe 65. Due to pressure of spring 67 the pistons 56, 57 will be in their normal position, in which they are shown in the drawing, and fluid under pressure supplied to chamber 59 will at the same time therefore flow through the ports 68 to the brake pipe 2 for charging said brake pipe and thereby other parts of the brake equipment. Fluid under pressure thus supplied to the brake pipe will also flow into chamber 59 in the brake application valve device 43a at the non-control end of the vehicle and equalize through port 66 in the piston 56 into chamber 64 and pipe 65, respectively, permitting said parts to be held in their normal position by the respective spring 67.

When the pressure of fluid in the brake pipe becomes increased to a chosen pressure, preferably somewhat below that which will be present in the brake pipe after affecting a full service reduction, such pressure effective in each of the switch devices 54, 54a will move the piston 76 against spring 78 to cause contact 80 to bridge contacts 81, 82 for thereby connecting the electric supply wire 3 to wire 85 connected to both magnets 74a. As soon as this occurs the brake valve handle will be moved to Release position permitting deenergization of magnet 87 and opening of contact 89 but the magnets 74a will now remain energized due to operation of the switch devices 54, 54a as just described.

After the brake system embodying the invention is initially charged the brakes on the vehicle may be applied and released by operation of handle 26 in the same manner as hereinbefore described, it being merely noted that supply of fluid under pressure to and its release from the brake pipe 2 by operation of the controlling brake valve device 10 or 10a will occur via ports 68 and chamber 59 in the respective brake application valve device 43 or 43a.

Now let it be assumed that with the vehicle in motion, the arm 94 of the trip valve device 91 at the leading end of the vehicle is struck by a road bed trip and swung out of its normal depending position to effect an emergency reduction in pressure in brake pipe 2 in response to which the switch devices 54 will operate to disconnect the electric supply wire 3 from the magnets 74 permitting deenergization thereof and venting of fluid under pressure from the chamber 64 in the brake application valve devices 43, 43a. At the brake application valve device 43 this venting of fluid under pressure from chamber 64 will so exceed the rate of supply from the brake valve device 10 through the port 66 that the pressure in chamber 59 at the opposite side of piston 56 will move said piston against spring 67 into contact with gasket 70 thereby actuating piston 57 to close communication between chamber 59 and ports 68, so as to cut off further flow of fluid under pressure to the brake pipe from the brake valve device 10 the handle 26 of which is still in Release position, and at the same time to open ports 68 to atmosphere via the passage 62. Thus upon operation of the trip valve device 91 the brake pipe will be vented through it followed by operation of the brake application valve device 43 to cut off the supply of fluid under pressure to the brake pipe and to open another vent from said brake pipe, whereby upon the automatic closing of said trip valve device the brake pipe will remain vented with the brake valve handle 26 still in Release position. In response to the emergency reduction in brake pipe pressure thus effected an emergency application of brakes will be effected on the vehicle by operation of the brake controlling valve device, as previously described, to bring the vehicle to a stop.

At the non-control end of the vehicle the venting of fluid under pressure from chamber 64 in the brake application valve device 43a will permit operation of piston 56 by stored fluid pressure in chamber 59 and pipe 42 to open its valve 57 but said valve will remain open only until such stored fluid pressure is dissipated through the ports 68. This operation of the brake application valve device 43a at the non-control end of the vehicle while it may hasten slightly the reduction in brake pipe pressure is, however, not necessary since the desired venting of the brake pipe will be assured by the brake application valve device 43 at the control end of the vehicle. If the control end of the vehicle were reversed then the brake application valve device 43a would respond to operation of the trip valve device 91a in the same manner and to accomplish the same result as when the control end is at brake valve device 10, as will be evident.

With the handle 26 of the controlling brake valve device 10 in Release position after the brakes have been applied by operation of the trip valve device 91 there will be a constant undesired leak of fluid under pressure to atmosphere via pipe 42, port 66 in the brake application valve device 43, pipe 65 and past the open valve 74 in the magnet valve device 53. To stop this leak the operator will turn the brake valve handle 26 to Lap position for cutting off supply of fluid under pressure to pipe 42 and hence terminating such leak.

When the brake valve handle 26 is turned to Lap position, as just mentioned, the electric supply wire 3 will be connected to the release wire 5 and, as a result, the magnet 87 will be energized to close contact for energizing both magnets 74a to close the respective valves 74 and thereby the vent from the respective brake application valve piston chambers 64. In the brake application valve device 43 the pressure of fluid will then equalize in opposite sides of the piston 56 through port 66 and permit spring 67 to move said piston and the piston 57 to their Down position for opening the connected pipe 42 to the brake pipe. With respect to the brake application valve device 43a the closing of valve 74 in the magnet valve device 74a will have no effect since the pistons in said application valve device will have assumed their lower position immediately after the emergency application of brakes was initiated by the trip valve device, as hereinbefore mentioned.

Whenever it is desired to release an emergency application of brakes effected by operation of a trip valve device the brake valve handle 26 must be moved from Lap position to the Electric Holding position for thereby supplying fluid under pressure to the brake pipe 2 via the connected pipe 42 and the brake application valve device 43 or 43a until the pressure in the brake pipe is increased to a degree sufficient to operate the switches 54, 54a to connect the current supply wire 3 to wire 85 following which the brake valve handle 26 may be moved to Release position to complete the release of brakes, it being noted that the magnet 87 energized in Holding position holds the magnets 74a energized until the switches 54, 54a operate which will then hold said magnets 74a energized upon return of the handle 26 to Release position with consequent deenergization of magnet 87 and opening of the contact 89 controlled thereby.

*Summary*

It will now be seen that by the addition of the brake application valve devices 43, 43a, the magnet valve devices 53, 53a, the switch devices 54, 54a and the switch device 55, to a brake equipment including operator's brake valve devices such as 10, 10a, automatic closing trip valve devices such as 91, 91a may be employed, since the brake application valve device will cut off supply of fluid under pressure to and vent fluid under pressure from the brake pipe upon operation of the trip valve device so as to ensure an application of brakes which will be positively retained until it is desired to release same. Moreover, after such an application, positive movement of the brake valve handle 26 is necessary to first avoid undesired loss of fluid under pressure and then to effect a release of a brake application, in other words, such an automatic application will not automatically release due to the automatic return of an operated trip valve device to normal condition.

Having now described my invention, what I claim as new and desire to secure by Letters Patent, is:

1. In a fluid pressure brake equipment, in combination, a brake pipe, an operator's brake valve device having a position for supplying fluid under pressure to said brake pipe, valve means controlling the supply of fluid under pressure from said brake device to said brake pipe and operative to cut off such supply, and to open a vent from said brake pipe, an automatic closing trip valve device arranged to be operated by a track trip to effect a reduction in pressure in said brake pipe, and means responsive to said reduction in pressure in said brake pipe to effect operation of said valve means.

2. In a fluid pressure brake equipment, in combination, a brake pipe, an operator's brake valve device having one position for supplying fluid under pressure to said brake pipe and having a second position for cutting off supply of fluid under pressure to said brake pipe, valve means controlling the brake pipe supply communication from said brake valve device to said brake pipe, an automatic closing trip valve device arranged to be operated by a track trip to effect a reduction in pressure in said brake pipe, means responsive to said reduction in pressure in said brake pipe to effect operation of said valve means to close said communication, and means cooperative with said brake valve device in said second position to effect operation of said valve means to open said communication.

3. In a fluid pressure brake equipment, in combination, a brake pipe, an operator's brake valve device having one position for supplying fluid under pressure to said brake pipe and having a second position for cutting off supply of fluid under pressure to said brake pipe, valve means controlling the fluid pressure supply communication to said brake pipe, and a vent from said brake pipe, an automatic closing trip valve device arranged to be operated by a track trip to effect a reduction in pressure in said brake pipe, means responsive to said reduction in pressure in said brake pipe to effect operation of said valve means to close said communication and open said vent, and means for actuating said valve means to open said communication and close said vent upon movement of said brake valve device to said second position.

4. In a fluid pressure brake equipment, in combination, a brake pipe, an operator's brake valve device having one position for supplying fluid under pressure to said brake pipe and having a second position for cutting off supply of fluid under pressure to said brake pipe, valve means controlled by pressure of fluid supplied by said brake valve device and an opposing fluid pressure and operative upon equalization of such fluid pressures to open the fluid pressure supply communication from said brake valve device to said brake pipe and operative upon dissipation of said opposing fluid pressure to close said communication and open said brake pipe to atmosphere, an automatic closing trip valve device arranged for operation by a track trip to effect a reduction in pressure in said brake pipe, means responsive to said reduction in pressure in said brake pipe to dissipate said opposing fluid pressure, and means for equalizing pressures on said valve means in response to movement of said brake valve device to said second position.

5. In a fluid pressure brake equipment, in combination, a brake pipe, an operator's brake valve device having one position for supplying fluid under pressure to said brake pipe and having a second position for cutting off supply of fluid under pressure to said brake pipe, valve means controlled by pressure of fluid supplied by said brake valve device and opposing pressure of fluid in a chamber, and operative upon a reduction in pressure of fluid in said chamber to close the fluid pressure supply communication between said brake valve device and said brake pipe and open said brake pipe to atmosphere, a restricted charging communication opening said chamber to the first named communication at the brake valve side of said valve means for charging said chamber with fluid under pressure, means operative upon substantial equalization of opposing pressures controlling said valve means to effect operation thereof to close communication between said brake pipe and atmosphere and open the fluid pressure supply communication between said brake valve device and said brake pipe, a control valve device for opening and closing a vent to said chamber, an automatic closing trip valve device arranged for operation by a track trip to vent fluid under pressure from said brake pipe, means controlled by pressure of fluid in said brake pipe for effecting operation of said control valve device to open the vent controlled thereby when the pressure of fluid in said brake pipe is less than a chosen degree and to close said vent at a higher pressure in said brake pipe, and other means controlled by said brake valve device operative in said second position, but not said first position, to also effect operation of said control valve device to close said vent.

6. In a fluid pressure brake equipment, in combination, a brake pipe, an operator's brake valve device having one position for supplying fluid under pressure to said brake pipe and a second position for cutting off supply of fluid under pressure to said brake pipe, a brake application valve device comprising a piston subject on one side to pressure of fluid supplied by said brake valve device and subject to opposing pressure of fluid in a chamber and operative upon venting said chamber to close the fluid pressure supply communication from said brake valve device to said brake pipe, means operative upon substantial equalization of opposing pressures on said piston to operate said brake application valve device to open said fluid pressure supply communication to said brake pipe, control valve means having one position for venting fluid under pressure from said chamber and a second position for holding fluid under pressure in said chamber, means operative with said control valve means in said second position to equalize the opposing pressures of fluid on opposite sides of said piston, an automatic closing trip valve device arranged for operation by a track trip to effect an emergency reduction in pressure in said brake pipe, means responsive to said emergency reduction in brake pipe pressure to effect operation of said control valve means to its one position and responsive to restoration of fluid pressure in said brake pipe to hold said control valve means in its second position, and means operative in said second position of said brake valve device, but not in said first position, to also effect operation of said control valve means to its one position.

7. In a fluid pressure brake equipment, in combination, a brake pipe, an operator's brake valve device having one position for supplying fluid under pressure to said brake pipe and another position for cutting off supply of fluid under pressure to said brake pipe, brake application means operative by fluid under pressure in one chamber upon venting of fluid under pressure from another chamber to close the fluid pressure supply communication from said brake valve device to said brake pipe and to open a vent from said brake pipe, means operative upon charging said one chamber with fluid under pressure to effect operation of said brake application means to open said communicaiton and close said vent, a magnet device operative upon deenergization to vent fluid under pressure from said chamber, means for charging said one chamber with fluid under pressure from said other chamber, means responsive to fluid in said brake pipe at and exceeding a chosen pressure to energize said magnet device and at less than said chosen pressure to effect deenergization of said magnet, and means operative in said other position but not said one position, of said brake valve device to also effect energization of said magnet device.

8. In a fluid pressure brake equipment, in combination, a brake pipe, a brake release wire, an operator's brake valve device having two positions for establishing a fluid pressure supply communication to said brake pipe and comprising means operative in one of said two positions to supply electric current to said release wire and in the other position to cut off supply of electric current to said release wire, valve means controlling said communication and including a magnet operative upon energization to effect operation of said valve means to open said communication and upon deenergization to close said communication, switch means controlled from said release wire operative upon supply of electric current thereto to effect energization of said magnet, other switch means operative by fluid in said brake pipe at and exceeding a chosen pressure to also effect energization of said magnet and operative in response to a lower pressure of fluid in said brake pipe to effect deenergization of said magnet, and an automatic closing trip valve device for effecting a reduction in pressure in said brake pipe.

References Cited in the file of this patent

UNITED STATES PATENTS

| Number | Name | Date |
| --- | --- | --- |
| 1,318,925 | Scott et al. | Oct. 14, 1919 |
| 1,608,187 | Ruthven | Nov. 23, 1926 |